F. D. Livingston. Stop Valve.

No. 120,292.                                     Patented Oct. 24, 1871.

Witnesses:
A. Bennewendorf.
Wm. H. C. Smith.

Inventor:
F. D. Livingston.
Per Mmm Co
Attorneys.

UNITED STATES PATENT OFFICE.

FRED. D. LIVINGSTON, OF NORWICH, CONNECTICUT.

IMPROVEMENT IN STOP-VALVES.

Specification forming part of Letters Patent No. 120,292, dated October 24, 1871.

*To all whom it may concern:*

Be it known that I, FRED. D. LIVINGSTON, of Norwich, in the county of New London and State of Connecticut, have invented a new and Improved Stop-Valve; and I do hereby declare that the following is a full, clear, and exact description thereof, which will enable others skilled in the art to make and use the same, reference being had to the accompanying drawing forming part of this specification.

My invention consists in improving stop-valves, as hereinafter fully described and subsequently pointed out in the claim.

Figure 1:
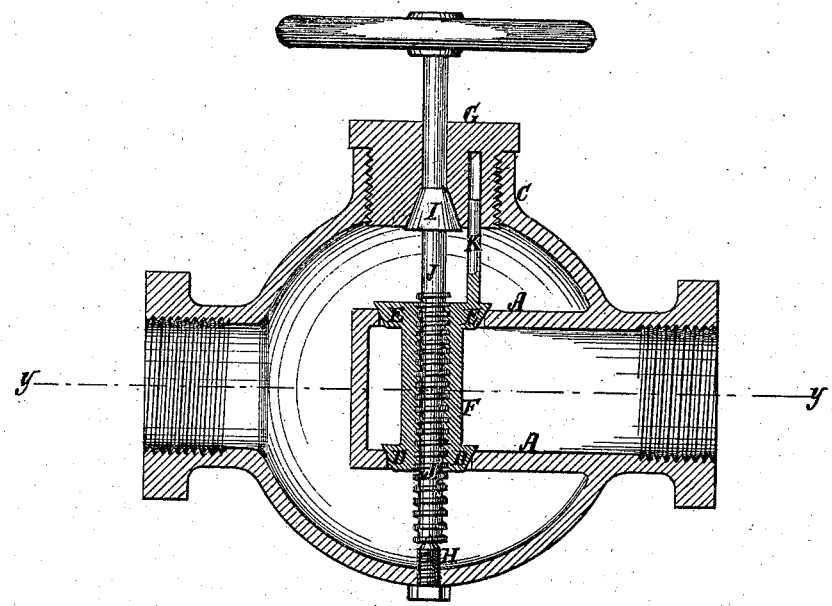
Figure 2:
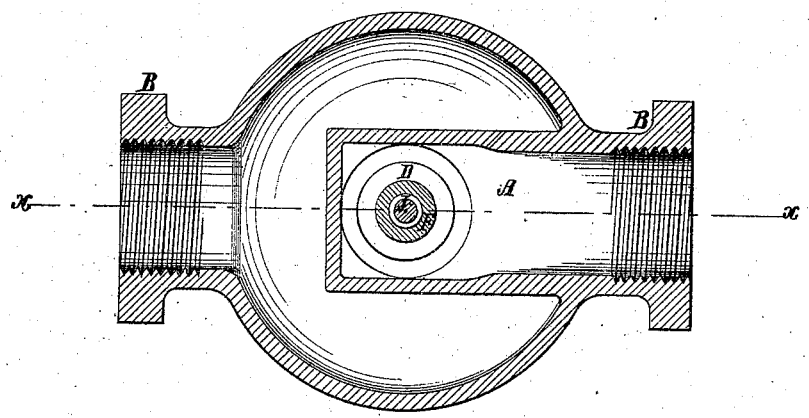

Figure 1 is a sectional elevation of my improved valve on the line $x$ $x$ of Fig. 2, and Fig. 2 is a horizontal section on the line $y$ $y$ of Fig. 1.

Similar letters of reference indicate corresponding parts.

I propose to arrange the dividing-plate within the shell with two parts, A, parallel with each other, one on each of two opposite sides of the axis of the connections B, and as far apart as the diameter of the said connection, or thereabout; and I make a valve-seat in each with their axes coinciding with the opening C through the shell for applying the valves, the lower seat being the smallest and the upper one large enough to pass the valve for the lower one through it; and for these two seats I make a double valve, D E, fitting both, and connected by the tube F, having an internal screw-thread, in which a screw-threaded stem, J, works to raise and lower the valves, the said stem passing through the screw-plug G and down to the adjustable step H in the lower side of the shell, on which it rests. The plug G has a valve-seat at the lower side surrounding the hole for the stem, and the latter has a conical valve, I, fitting it, and held up against it by the screw H, to be used for preventing the escape of steam instead of the packing commonly used. The valves are prevented from turning with the stem by friction by the pin K rising up into a hole in plug G.

By the employment of the two plates A and the two valves, I am enabled to provide more free passage within a shell of a given size than can be done by the ordinary arrangement. This improved valve is well adapted for connecting to a governor for use as a throttle-valve for regulating the speed of an engine.

Having thus described my invention, I claim as new and desire to secure by Letters Patent—

The screw J having valve I, double valve D E F having rod K forming part thereof, and valve-seated and recessed plug G combined with a shell having the parts A parallel to each other, all being constructed, arranged, and applied together, as and for the purpose specified.

FRED. D. LIVINGSTON.

Witnesses:
A. V. GLADIS,
J. WHEELER.

(167)